Figure 1:
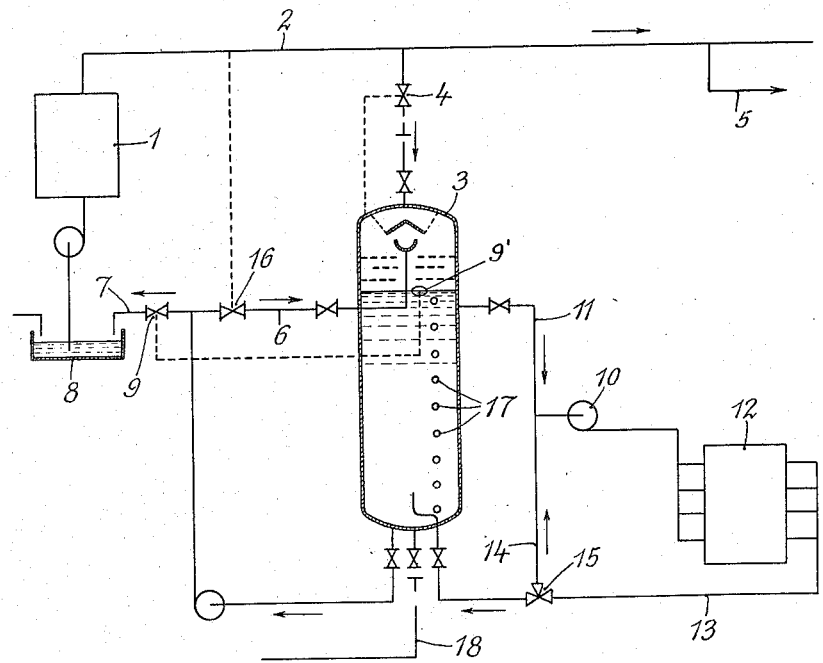

May 1, 1951     K. K. KIELLAND     2,550,822

HOT WATER ACCUMULATING PLANT

Filed Nov. 22, 1946

Inventor
KASPAR KRUSE KIELLAND
By
Haseltine, Lake & Co.
Attorneys

Patented May 1, 1951

2,550,822

UNITED STATES PATENT OFFICE 2,550,822

HOT-WATER ACCUMULATING PLANT

Kaspar Kruse Kielland, Sogn, near Oslo, Norway, assignor, by mesne assignments, to Nikolai Alfsen, Stabekk, Norway, (Mrs.) Andrea Gunderson, Lysaker, Norway, Kaspar Kruse Kielland, Sogn, near Oslo, Norway, and Arird Ruths, Stockholm, Sweden Application November 22, 1946, Serial No. 711,773
In Sweden November 17, 1945

Section 1, Public Law 690, August 8, 1946
Patent expires November 7, 1965

4 Claims. (Cl. 122—35)

The present invention refers to a hot water accumulating plant comprising an accumulator and which has an automatically controllable valve in the steam supply line to the accumulator. In known plants of this kind the steam supply from the boiler to the accumulator is as a rule controlled by means of a reducing valve, i. e. dependent on the steam pressure of the accumulator, or in other words dependent on the steam supply required by the accumulator. This entails a rather constant load on the boiler even with a highly varying hot water consumption, a constant circulation of water being maintained in a loading circuit through which cold water is constantly conveyed from the bottom of the accumulator to a hot water generator at the upper part of the accumulator, where the water is heated by the entering steam, for which reason an increase or decrease of the hot water output only causes a displacement of the boundary between the cold water and the hot water zones of the accumulator.

However, whereas the steam supply required by the accumulator is kept constant in this way, it is not possible to take into account variations in the quantity of steam at disposal, for example caused by a varying steam demand of other steam consumers or varying heating conditions in the boiler.

The object of the present invention is to eliminate this drawback by making the accumulator exert an accumulating action not only on the secondary side, but even on the primary side, i. e. not only with respect to the water consuming side, but also with respect to the steam system.

The invention is mainly characterized in that two water circulation systems are connected to the accumulator, one of which includes a hot water consumer and starts from the upper part of the accumulator below the water level and returns at the bottom of the accumulator, whereas the other (the loading circuit) starts from a point near the accumulator bottom and returns to the accumulator above the highest water level thereof, and that also the steam supply line discharges above the highest water level of the accumulator, so that the entering steam is practically as a whole condensed above the water level, and that also in the other water circulating system (the loading circuit) an automatically controllable valve is provided, the two valves being adapted to supply steam and water respectively to the accumulator in such quantities that the steam pressure in the steam supply line is prevented from exceeding a certain predetermined value and that the water temperature in the upper part of the accumulator is kept substantially constant. Further, the arrangement may be such that the valve in the steam supply line is constituted by an overflow valve which opens when the boiler pressure exceeds a certain definite value, the valve in the loading circuit being then arranged for automatically adapting the water supply of the accumulator to the steam supply. Instead of this, the valve in the loading circuit may be constructed as an overflow valve receiving a controlling impulse from the primary steam pressure, whereas the valve in the steam supply line of the accumulator is constructed as a reducing valve receiving a controlling impulse from the steam pressure in the accumulator.

Thus in a plant of this kind considerable variations and even temporary complete cut-off of the steam supply may be permitted, the water supply through the loading circuit varying to a corresponding extent and being cut off on cut-off of the steam supply, so that the temperature in the upper part of the accumulator is constantly kept unaltered.

The valve in the loading circuit according to the first alternative or the valve in the steam supply line according to the second alternative may be adapted to respond to the pressure in the boiler, but conveniently it operates dependent on the temperature in the upper part of the accumulator, preferably so that it responds to the steam pressure in the accumulator, which involves a control which is more sensitive than a control dependent on the temperature.

In order to avoid the risk of the accumulator being emptied for hot water during a prolonged period of time with great hot water demand and small steam supply, it may be convenient to keep the stoker informed as to how much hot water is left in the accumulator. As the average temperature of the accumulator is a function of the said quantity, such an indication may easily be obtained by means of an instrument which is connected to a row of series-connected thermoelements equally distributed over the vertical length of the water space of the accumulator. It may then be ascertained on the said instrument when the average temperature has fallen so much that the fire must be enforced.

Figure 2:
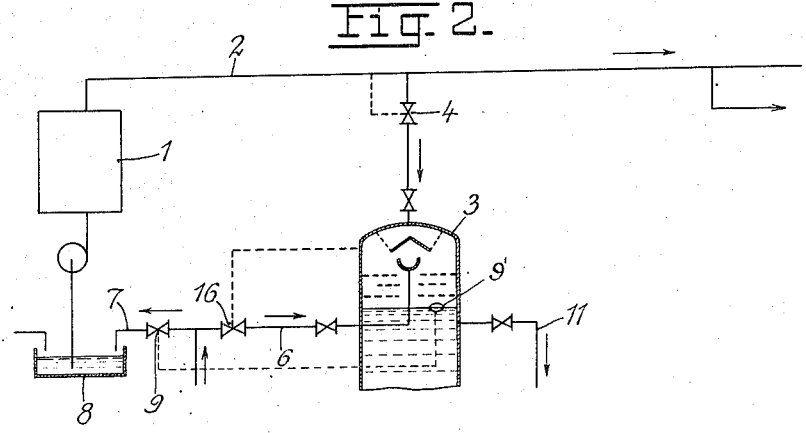

The invention will be more readily understood from the following description, reference being made to the accompanying drawings wherein Fig. 1 is a diagram of the first embodiment of the invention and Fig. 2 has a similar diagram showing part of a modification of the embodiment of Fig. 1.

From the boiler 1, which may be heated electrically or with any sort of fuel, the steam flows under pressure into the line 2 and further to the accumulator 3 through the automatically controlled valve 4 and a non-return valve and if desired to other steam consumers indicated at 5. The steam enters at the top of the accumulator 3 and is there condensed in a cascade converter, provided above the water level, by means of water which is introduced from the bottom of the accumulator through a water circulation system or loading circuit 6 for maintaining a constant high temperature in the upper water layer of the accumulator.

Thus the entering steam is condensed substantially as a whole above the water level, which is of importance with a view to maintain a marked division of the hot and cold water layers of the accumulator. A line 7 for surplus water branched from the loading circuit 6 and discharging into a feed water reservoir 8 is provided with a valve 9, which is controlled by a float 9' for maintaining a constant water level in the accumulator 3. For the first filling of the accumulator and for supplemental filling with relatively cold water a line 18 with a non-return valve is connected to the accumulator at the bottom thereof.

Hot water from the upper part of the water space of the accumulator flows down through a second water circulating system, the same being by means of a pump 10 fed to a hot water consumer, for example a wallboard press 12, from which the water is returned through a return line 13 to the lower part of the accumulator. Through a shunt line 14, which may be controlled by means of a valve 15, part of the used water from the line 13 is returned to the line 11. The valve 15 may be controlled by hand or automatically, for example dependent on the temperature in the line section between the pump 10 and the hot water consumer 12 in such a manner that the temperature in the said line section is maintained constant. If for example the hot water consumer is constituted by a wallboard press, the temperature of the water supplied to the press may be kept at approximately 170 degrees centigrade, while the return water from the press has a highly varying temperature, dependent on the load, for example 130 to 168 degrees centigrade with an average value of approximately 155 degrees centigrade, and the temperature of the upper water layer of the accumulator may be approximately 190 to 200 degrees centigrade. Owing to the fact that the circuit 11, 10, 12, 13 starts from the upper part of the accumulator and returns at the bottom of the accumulator, the latter operates as a layer accumulator, so that the regulation of the valve 15 necessitated by variations of load only causes a displacement of the boundary between the hot and cold water in the accumulator.

However, in order that it shall be possible also to permit variations in the steam supply, for example caused by variations of available electric power or varying moisture content of the fuel in the boiler 1 or changes in the steam demand of other steam consumers, there is provided in addition to the valve 4 a second controlled valve 16, which is located in the loading circuit. As indicated by dotted lines, the valve 16 receives its impulse from the pressure in the steam conduit 2. The said valve is constructed as an overflow valve which opens more when the steam pressure exceeds a certain predetermined value. The valve 4 is constructed as a reducing valve, which responds preferably to the steam pressure in the accumulator in such a manner that it opens when the said pressure tends to fall below a certain value. When for example the pressure in the steam line 2 increases, for instance consequent to a decrease of the steam consumption at 5, the valve 16 opens more and admits a greater quantity of cold water from the lower part of the accumulator to the cascade in the steam space of the accumulator. Thereby the pressure in the accumulator decreases, and the valve 4 in the steam supply line opens so as to maintain the pressure and hence the temperature in the accumulator. Thus the steam supply to the accumulator is increased, and at the same time the pressure in the steam line 2 is kept approximately constant. When the pressure falls in the line 2 for example consequent to increased steam consumption at 5 or owing to a change in the quality of the fuel, the valve 16 is actuated in the closing direction, and the water flow through the loading circuit is decreased. In consequence thereof the pressure in the accumulator increases, which in turn entails a decrease of the admission of the valve 4. Thus the steam supply to the accumulator is decreased, and the pressure in the line 2 as well as the temperature of the hot water layer in the accumulator is thereby kept practically constant.

The overflow valve 16 may even be closed entirely when the pressure in the line 2 falls below a certain value, for example 15 kgs./cm.$^2$ above the atmospheric, if the boiler 1 has normally 20 kgs./cm.$^2$ above the atmospheric. In this case the steam supply to the accumulator is cut off completely until the pressure in the steam line again exceeds 15 atmospheres.

17 designates thermo-elements which are conveniently distributed equally over the vertical length of the water space of the accumulator and connected in series in order to indicate the average temperature of the accumulator water at an instrument in the boiler house, as mentioned previously.

Instead of adopting the arrangement described above, according to Fig. 2 the valves 4 and 16 may be constructed in such a manner that the valve 4 operates as an overflow valve and receives its impulse from the steam pressure in the line 2 or the boiler 1, whereas the valve 16 is automatically controlled in response to changes of steam pressure in the accumulator so as to adapt the supply of cooled water to the steam supply. Also in this manner a constant water temperature in the upper layer of the accumulator as well as a constant steam pressure in the line 2 is maintained. If the valve 4 in the steam supply line is made as an overflow valve, it may happen, however, that the safety valve of the accumulator opens on large steam supply before the water supply through the valve 16 has had the time to be increased corresponding to the increased steam supply, whereby the division of hot and cold water in the accumulator may be lost. For this reason it is believed that as a rule the arrangement shown in Fig. 1 will be preferable, since in this case the reducing valve 4 automatically prevents the occurrence of a too high pressure in the accumulator.

Besides, the arrangement shown in Fig 1 operates with less hunting, since the overflow impulse, which is decisive for the balancing effect of the accumulator on the steam mains, acts directly upon the water supply to the cascade converter in the steam space of the accumulator, instead of indirectly according to the arrangement shown in Fig. 2.

The invention is of course not restricted to the details shown and described.

I claim:

1. A hot water accumulating plant comprising a substantially upright hot water accumulator, a conduit for supplying steam to said accumulator adjacent the top thereof, automatic level controlled tapping means for maintaining a substantially constant water level within the accumulator, a first water circulating circuit connected to said accumulator and starting from adjacent the bottom and discharging within the accumulator above said level and in such relation to the outlet of said steam conduit as to cause condensation of steam introduced therethrough, a second water circulating circuit connected to the accumulator and arranged for supplying heat to a heat consumer, said second circulating circuit starting from the upper part of the accumulator below said level and discharging into the accumulator adjacent the bottom thereof, and automatic means in said steam supply conduit and in said first mentioned circulation circuit for controlling the flow of steam and water, respectively, therethrough so as to effect a supply of steam and water to the upper part of the accumulator properly balanced for causing substantially complete condensation above said level and to maintain a substantially constant steam pressure in the accumulator and hence a substantially constant temperature of an upper water layer therein.

2. A hot water accumulating plant comprising a substantially upright hot water accumulator, a conduit for supplying steam to said accumulator adjacent to the top thereof, automatic level-controlled tapping means for maintaining a substantially constant water level within the accumulator, a first water circulating circuit connected to said accumulator and starting from adjacent the bottom and discharging within the accumulator above said level in such relation to the outlet of said steam conduit as to cause condensation of steam introduced therethrough, a second water circulating circuit connected to the accumulator and arranged for supplying heat to a heat consumer, said second circulating circuit starting from the upper part of the accumulator below said level and discharging into the accumulator adjacent the bottom thereof, a reducing valve in said steam supply conduit for controlling the flow of steam therethrough in response to the steam pressure in the accumulator and an overflow valve in said first mentioned water circulating circuit for controlling the flow of water therethrough in response to the steam pressure prevailing in said steam conduit ahead of said reducing valve so as to effect a supply of steam and water to the upper part of the accumulator properly balanced for causing substantially complete condensation above said level and to maintain a substantially constant steam pressure in the accumulator and hence a substantially constant temperature of an upper water layer therein.

3. A hot water accumulating plant comprising a substantially upright hot water accumulator, a conduit for supplying steam to said accumulator adjacent the top thereof, automatic level-controlled tapping means for maintaining a substantially constant water level within the accumulator, a first water circulating circuit connected to said accumulator and starting from adjacent the bottom and discharging within the accumulator above said level and in such relation to the outlet of said steam conduit as to cause condensation of steam introduced therethrough, a second water circulating circuit connected to the accumulator and arranged for supplying heat to a heat consumer, said second circulating circuit starting from the upper part of the accumulator below said level and discharging into the accumulator adjacent the bottom thereof, an overflow valve in said steam supply conduit for controlling the flow of steam therethrough into the accumulator in response to the steam pressure prevailing ahead of said overflow valve, and an automatically operated valve in said first mentioned water circulating circuit for controlling the flow of water therethrough into the accumulator in response to the steam pressure therein so as to effect a supply of steam and water, to the upper part of the accumulator properly balanced for causing substantially complete condensation above said level and to maintain a substantially constant steam pressure in the accumulator and hence a substantially constant temperature of an upper water layer therein.

4. In a steam plant which comprises a boiler and mains for supplying steam from said boiler to a steam consumer, a substantially upright hot water accumulator, a conduit connected to said mains for supplying steam to said accumulator adjacent the top thereof, automatic level-controlled tapping means for maintaining a substantially constant water level within the accumulator, means for feeding excess water from said tapping means to said boiler for steam generation, a first water circulating circuit connected to said accumulator and starting from adjacent the bottom and discharging within the accumulator above said level and in such relation to the outlet of said steam conduit as to cause condensation of steam introduced therethrough, a second water circulating circuit connected to the accumulator and arranged for supplying heat to a heat consumer, said second circulating circuit starting from the upper part of the accumulator below said level and discharging into the accumulator adjacent the bottom thereof, and automatic means in said steam supply conduit and in said first mentioned circulation circuit for controlling the flow of steam and water, respectively therethrough so as to effect a supply of steam and water to the upper part of the accumulator properly balanced for causing substantially complete condensation above said level and to maintain a substantially constant steam pressure in the accumulator and hence a substantially constant temperature of an upper water layer therein.

KASPAR KRUSE KIELLAND.

REFERENCES CITED

The following references are of record in the file of this patent:

UNITED STATES PATENTS

| Number | Name | Date |
|---|---|---|
| 1,700,651 | Ruths | June 29, 1929 |

FOREIGN PATENTS

| Number | Country | Date |
|---|---|---|
| 116,436 | Switzerland | Nov. 17, 1924 |
| 729,924 | France | Mar. 25, 1931 |
| 480,403 | Great Britain | Feb. 22, 1938 |
| 219,078 | Switzerland | Jan. 31, 1942 |